United States Patent [19]

Sugimoto

[11] Patent Number: 5,729,000
[45] Date of Patent: Mar. 17, 1998

[54] IC CARD READER

[75] Inventor: Yasuki Sugimoto, Tokyo, Japan

[73] Assignee: Oki Electric Industry Co., Ltd., Tokyo, Japan

[21] Appl. No.: 637,719

[22] PCT Filed: Aug. 29, 1995

[86] PCT No.: PCT/JP95/01710
§ 371 Date: Apr. 30, 1996
§ 102(e) Date: Apr. 30, 1996

[87] PCT Pub. No.: WO96/07160
PCT Pub. Date: Mar. 7, 1996

[30] Foreign Application Priority Data

Aug. 31, 1994 [JP] Japan ............... 6-232112

[51] Int. Cl.⁶ ............................................. G06F 7/06
[52] U.S. Cl. ............................. 235/441; 235/492
[58] Field of Search ........................ 235/441, 492

[56] References Cited

U.S. PATENT DOCUMENTS 4,743,746  5/1988  Murschall .
5,231,274  7/1993  Reynifer ........................... 235/441
5,517,011  5/1996  Vandenengel .

FOREIGN PATENT DOCUMENTS 61-139895  6/1986  Japan .
62-254286  11/1987  Japan .

Primary Examiner—Harold Pitts
Attorney, Agent, or Firm—Spencer & Frank

[57] ABSTRACT

An IC card reader (2) according to the present invention comprises a lower cover (10) which forms a floor of a housing, an upper cover (20) which is installed on the lower cover (10) to form the housing together with the lower cover (10), and a circuit board (30) installed in an upper space of the upper cover (20). The lower cover (10) is provided with a swingable depressing part (12), the upper cover (20) is provided with an insertion slit (22) for the IC card, an insertion passage (23) communicated with the insertion slit (22), a window (24) opposing to an external terminal (1a) of an IC cad (1) inserted into the insertion passage (23) and swingable card protection arm (25) and the circuit board (30) is provided with a card connector (31). It is characterized in that the circuit board (30) is installed on the upper cover (20) so that the card connector (31) is opposed to the external terminal (1a) of the IC card (1) inserted into the insertion passage (23) through the window (24)

2 Claims, 4 Drawing Sheets

IC CARD READER

BACKGROUND OF THE INVENTION

1. Field of the Invention

The present invention relates to a portable type apparatus for reading information recorded on an IC card.

2. Description of the Background Art

An apparatus shown in FIG. 4 has been known as a portable type IC card reader. This apparatus 60 is constructed so that a connector 70, which is formed as a separate unit from a housing, is built in the housing of the apparatus 60 and a connection terminal of the connector 70 is connected to an external terminal of the IC card 78 to enable reading of information stored on the IC card.

FIG. 5 shows a disassembled cross sectional view of the connector 70 before the IC card 78 is inserted. In FIG. 5, 71 is a connection terminal, 72 is a terminal holder, 73 is a groove, 74 is a frame, 75 is a spring, 76 is a rib and 77 is an inlet slit. The terminal holder 72 to which the connection terminal 71 is attached has the rib 76 which extends in a vertical direction at a side opposing to the inlet slip 77 and is energized towards the inlet slit 77 by the spring provided behind the rib 76. The terminal holder 72 is engaged with the groove 73 provided in the frame 74 and moved along the groove 73 in the frame 74.

FIG. 6 shows a cross sectional view of the connector 70 after the IC card 78 has been inserted. The connector 70 into which the IC card 78 has been inserted comes in a state that the rib 76 of the terminal holder 72 is kept in contact with the extreme end of the IC card 78. When the IC card 78 is further inserted inwardly from the above-described state, the terminal holder 72 is moved inwardly. In this case, the terminal holder 72 is moved down inwardly while being guided by the groove 73 provided on the frame 74. The terminal holder 72 is slantly moved as the IC card 78 is moved in a horizontal direction. The terminal holder 72 is moved as described above and to cause the connection terminal 71 of the terminal holder 72 to be connected with the external terminal of the IC card. When a power supply switch is turned on under this condition, the IC card reader 60 reads the information stored in the IC card 78.

However, the connector 70 has a complex construction including moving members and this complex mechanism of the connector 70 has resulted in malfunctioning and contact abnormality. The connector 70 has been formed as a unit separated from the housing for its complex mechanism. In other words, the IC card reader has been doubly structured by combining the connector 70 and the housing. Therefore, the IC card reader 60 has included a larger number of component parts, and has been extremely excessive in its construction and configuration and uneconomical in the man-hours and costs for manufacturing. In addition, it has been difficult to down-size the apparatus.

The present invention is intended to solve the above problems and implement the following points.

(1) Improvement of certainty and reliability of the card reading operation by simplifying the mechanism of the connector.

(2) Elimination of wasteful construction configuration as well as reduction of the number of component parts by forming the connector as a unit which is integral with the housing for simplification of the construction of the apparatus.

(3) Contribution to down-sizing and cost reduction of the apparatus by simplifying the mechanism of the connector and the configuration of the apparatus.

SUMMARY OF THE INVENTION

An object of the present invention is to provide an IC card reader capable of solving the above-described problems. The IC card reader according to the present invention comprises a lower cover which forms a floor of an apparatus, an upper cover to be installed on the lower cover and a circuit board to be mounted on the upper cover.

The lower cover is formed with a bottom plate provided with a swingable part (depressing part) for pushing the IC card from the rear side.

The upper cover is formed with an insertion slit for the IC card, an insertion passage communicated with the insertion slit, a window opposing to the external terminal of the IC card to be inserted into the insertion passage, and a bottom plate provided With a swingable part (a card protection arm) for pushing the IC card, which is pushed from the rear surface side by the depressing part of the lower cover, from the surface side against depression by the depressing part.

The circuit board is formed with a board on which a card connector is provided at a position opposing to the external terminal of the IC card inserted into the insertion passage. A switching terminal for turning on and off the power supply is provided on the underside of the circuit board.

The IC card reader according to the present invention accommodates the IC card which is guided into the insertion passage through the insertion slit. When the depressing part provided on the lower cover is pushed up under this condition, the IC card is upwardly warped and accordingly the external terminal of the IC card is also moved upwardly. Therefore, the external terminal is connected to the connection terminal of the card connector. Upward movement of the external terminal is carried out in a stable attitude since the depressing part and the card protection arm support the IC card. In this case, the switch terminal is pushed by the card protection arm and the swing end of the switching terminal connects a contact provided on the circuit board. Thus, the circuit board becomes electrically conductive.

DETAILED DESCRIPTION OF THE INVENTION

Figure 1:
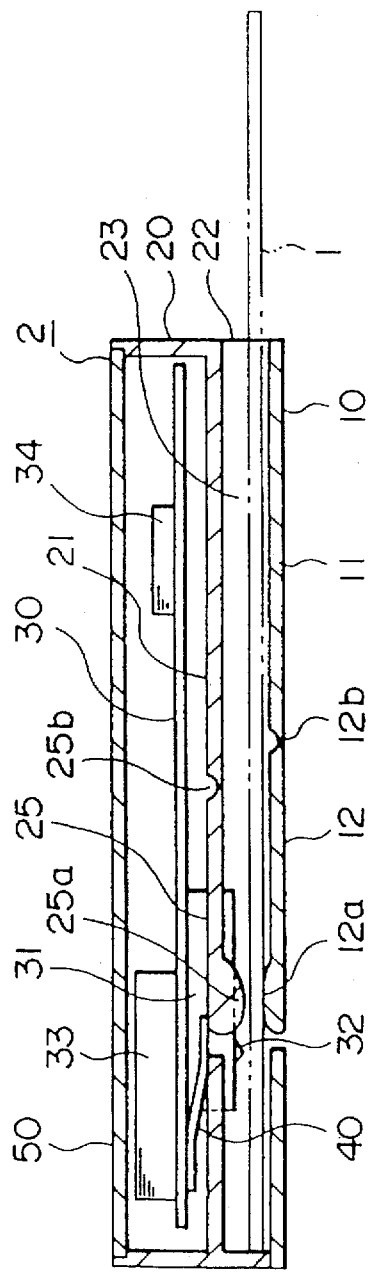
FIG. 1 is a cross sectional view of an embodiment according to the present invention.
Figure 2:
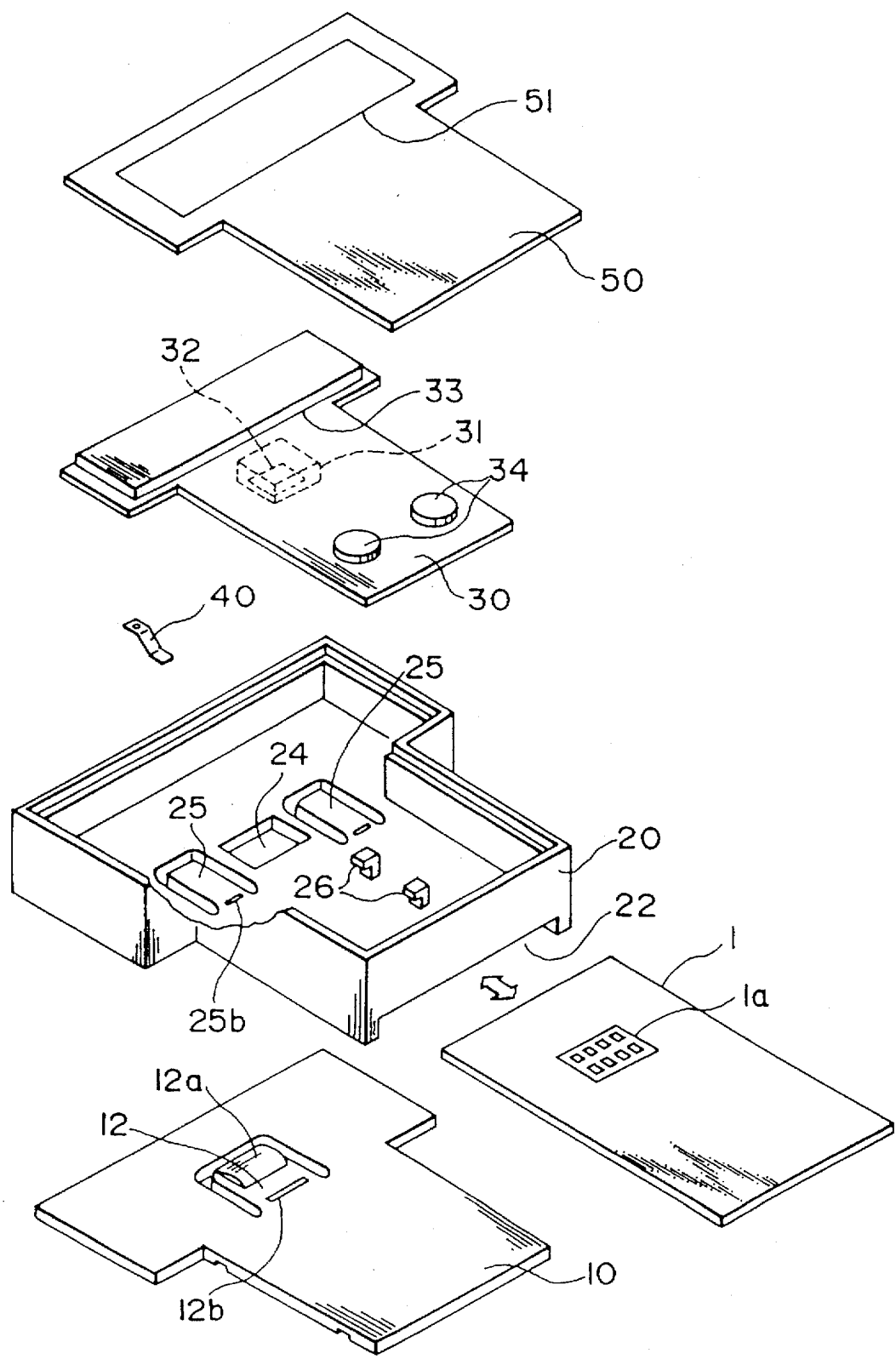
FIG. 2 is a disassembled perspective view of the embodiment.

An IC card reader according to the present invention is described below referring to the accompanying drawings. FIG. 1 shows a cross sectional view of an apparatus as the IC card reader before an IC card is inserted therein. FIG. 2 shows a disassembled perspective view of the IC card reader with the constructions of respective component parts thereof.

As shown, the IC card reader 2 comprises a lower cover 10 which forms the floor of the housing of the apparatus, an upper cover 20 which is installed on the lower cover 10 to form the housing of the apparatus together with the lower cover 10, a circuit board 30 to be installed in a space provided on the upper cover 20, and a cover 50 which is installed on the upper cover 20 to seal the circuit board 30.

A depressing part 12, which is swingable in a vertical direction around a hinge groove 12b as a fulcrum, is formed to be integral with the bottom plate 11 of the lower cover 10. This depressing part 12 serves to push the IC card 1 inserted into the apparatus onto the upper cover 20. Therefore, the depressing part 12 is disposed at a position suitable for pushing up the IC card 1. The swing end of the depressing part 12 is provided with a bulged portion 12a having a gently curved surface so as to appropriately apply a depressing force to the IC card 1 without damaging the IC card 1.

The insertion slit 22, the insertion passage 23 communicated with this insertion slit 22 and the window 24 are integrally formed on the bottom plate 21 of the upper cover 20. The insertion slit 22 is an elongate opening provided at one end of the bottom plate 21 to insert the IC card into the apparatus. The insertion passage 23 is a space formed between the bottom plate 21 of the upper cover 20 and the bottom plate 11 of the lower cover 10. The window 24 is an opening provided at a position opposing to the external terminal 1a of the IC card 1 inserted into the insertion passage 23. A card connector 31 described later is inserted into this window 24.

The card protection arm 25 which is swingable in the vertical direction around the hinge groove 25b is formed on the bottom plate 21 of the upper cover 20. This card protection arm 5 is a member for pushing the IC card from the surface side of the IC card against depression by the depressing part 12 so as to protect the surface of the IC card pushed from the rear surface side thereof by the depressing part 12 of the lower cover 10. The card protection arm 5 is arranged at, for example, both sides of the window 24. The swing end of this arm protection arm 25 is provided with a bulged portion 25a having a gently curved surface as the swing end of the depressing part 12. The top surface of the bulged portion 25a protrudes below a connection terminal 32 described later toward the insertion passage 23.

An upper space is formed in the upper cover 20 and the circuit board 30 is installed in this space.

The circuit board 30 is provided on its upper and lower surfaces with patterns for connecting a card connector 31, a switching terminal 40, a battery 34 and an LCD 33 which are described below, and fixed to the upper cover 20 by board fixing hooks 26 provided on the upper surface of the upper cover 20.

The circuit board 30 is provided with the card connector 31 and the switching terminal 40 composed of a conductive spring plate on its lower surface (a surface at the side of the upper cover 20). The card connector 31 is installed at a position opposing to the external terminal 1a of the IC card 1 inserted into the insertion passage 23. This position is aligned with the position of the window 24 of the upper cover 20 whereby the connection terminal 32 of the card connector 31 is faced to the insertion passage 23 through this window 24. The switching terminal 40 is installed at its fixing end to the circuit board 30 by soldering and kept in contact with the rear surface of the bulged portion 25a of the card protection arm 25 at the swing end. The swing end of the switching terminal 40 connects the contact provided on the circuit board 30 when the depressing part 12 of the lower cove 10 is pushed to actuate the card protection arm 25 of the upper cover 20. Thus, the circuit board 30 becomes electrically conductive (power ON state).

The circuit board 30 is provided on its surface with the battery 34 for driving the circuit and the LCD 33 for displaying the information stored in the card. The battery 34 supplies a power to the circuit board 30 when the power supply is turned on. The LCD 33 which incorporates a CPU in which a specified program is stored in advance activates the specified program when the power supply is turned on and displays the information read from the IC card according to the program.

The circuit board 30 is sealed by a cover 50 to be installed on the upper cover 20.

The cover 50 is provided with a window 51 at a position opposing to the LCD 33 of the circuit board 30. Therefore, the display of the LCD 33 can be visually checked from outside the apparatus.

As described above, the upper cover 20 is installed on the lower cover 10, the circuit board 30 is installed in the upper space of the upper cover 20 and the cover 50 is installed on the upper cover 20, thereby forming the IC card reader 2.

Figure 3:
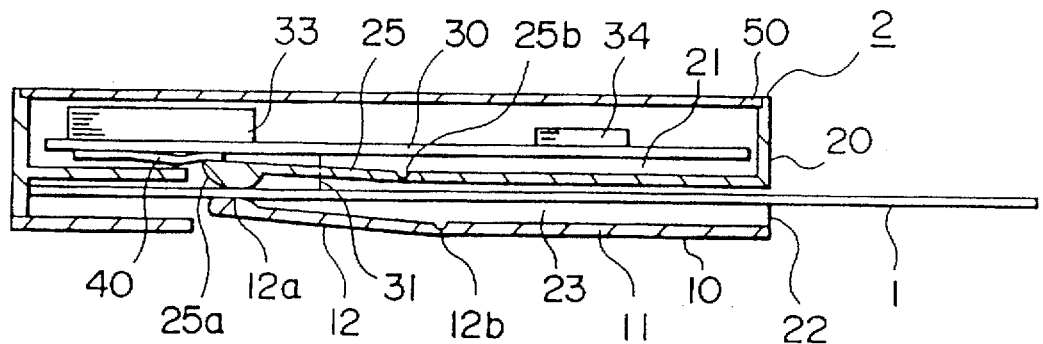
FIG. 3 is a cross sectional view of the embodiment after the IC card is inserted.
Figure 4:
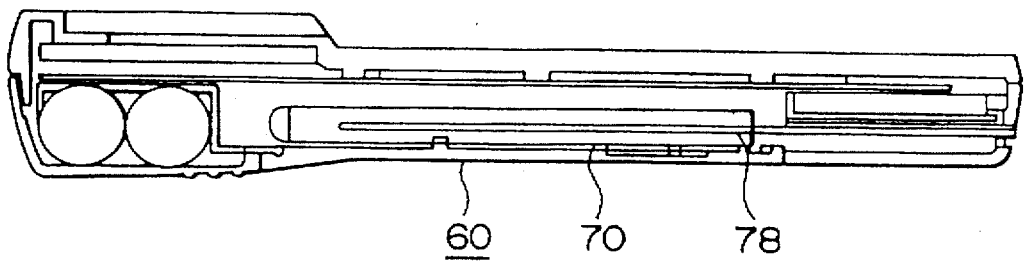
FIG. 4 is a cross sectional view of an embodiment according to the prior art.
Figure 5:
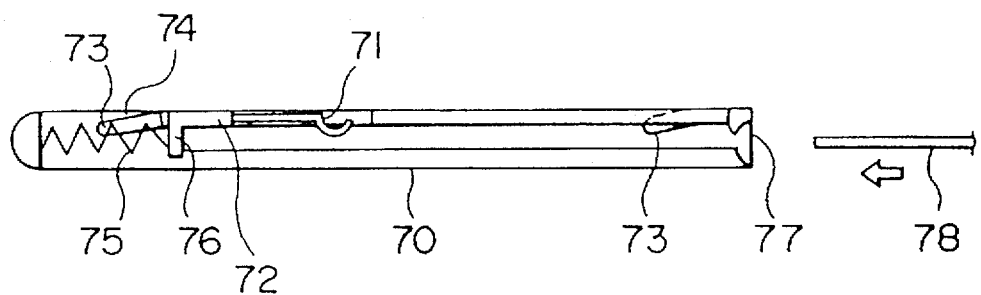
FIG. 5 is a cross sectional view of a connector before the IC card is inserted.
Figure 6:
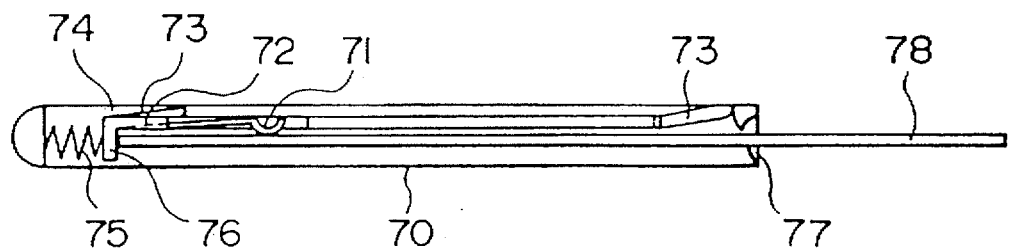
FIG. 6 is a cross sectional view of a connector after the IC card is inserted.

Reading operation of the IC card reader 2 according to the present invention is described referring to the drawings. FIG. 3 is a cross sectional view of the apparatus after the IC card has been inserted therein.

As shown in the drawing, the IC card 1 inserted into the insertion passage 23 from the insertion slit 22 is further inwardly inserted while sliding on the bulged portion 25a of the card protection arm 25. When the extreme end of the IC card 1 comes in contact with a stopper, not shown, the IC card is fixed at a position where the external terminal 1a on the IC card 1 is aligned with the window 24 of the upper cover 20. The external terminal 1a on the IC card 1 slides on the bulged portion 25a and therefore the external terminal 1a is not damaged.

The IC card fixed by the stopper receives a depressing force applied from the underside by the depressing part 12 when the depressing part 12 of the lower cover 10 is pushed up by a drive source, not shown, for example, manual operation. The IC card 1 is upwardly warped and the external terminal 1a is upwardly moved. The window 24 of the upper cover 20 is provided above the external terminal 1a and the connection terminal 32 of the card connector 31 is exposed through the window 24. Therefore, the external terminal 1a and the connection terminal 32 are connected (see FIG. 3). In this case, the IC card is upwardly moved while being held by and kept in contact with the depressing part 12 and the card protection arm 25. Accordingly, attitude of the IC card is stabilized and the external terminal 1a and the connection terminal 32 are satisfactorily connected. As shown in the drawing, if the card protection arm is formed at two positions, the IC card 1 is upwardly moved while being supported at three points. Consequently, the attitude of the IC card 1 is further stabilized and the connection of the external terminal 1a and the connection terminal 32 is more satisfactorily carried out. The bulged portions 12a and 25a provided respectively on the depressing part 12 and the card protection arm 25 serve to reduce frictional resistance applied to the IC card 1 when the external terminal 1a is upwardly moved. Therefore, this reduction of the frictional resistance contributes to stabilization of the attitude of the IC card 1.

On the other hand, when the depressing part 12 is pushed up, the swing end of the switching terminal 40 connects the contact of the circuit board 30 by the card protection arm 25 which follows the depressing part 12. The power supply for the circuit board 30 is turned on. The card reader 2 activates the specified program and starts reading of the IC card 1 according to the program. The information of read from the IC card 1 is displayed on the LCD 33.

When the IC card 1 is released from depression by the depressing part 12, the IC card 1 is moved down and connection of the external terminal 1a and the connection terminal 32 is canceled. Similarly, connection of the swing end of the switching terminal 1a and the contact of the circuit board 30 is canceled. The LCD 33 is turned off and the IC card reader 2 finishes reading operation.

As described above, in the IC card reader 2 according to the present invention 2, the card connector 31 and the circuit board 30 are integrated and the card reading mechanism is fixed at the specified position. The apparatus 2 is formed by integrating the lower cover 10 and the upper cover 20 which form the housing with a mechanism for upwardly moving the IC card inserted into the insertion passage 23 as an assembly. Accordingly, the apparatus 2 can be formed to have the card connector and the housing which are integrated as one unit and therefore a mechanism of the conventional apparatus, that is a mechanism having a terminal holder 72, a frame 74 and a spring 75 can be eliminated. Consequently, the construction of the mechanism can be substantially simplified and the number of component parts can be reduced. Along with the above, the number of manufacturing man hours and costs can also be reduced. In addition, the apparatus itself can be down-sized. Moreover, the movement of the IC card 1 inserted into the insertion passage 23 is simple and stable because the IC card 1 is only moved vertically. Therefore, the external terminal 1a of the IC card and the connection terminal 32 of the card connector 31 can be satisfactorily connected. The certainty and reliability of reading operation can be improved by operating the switching terminal 40 in conjunction with operation of the depressing part 12 of the lower cover 10.

DESCRIPTION OF REFERENCE NUMERALS

1: IC card
1a: External terminal
2: IC card reader
10: Lower cover
11: Bottom plate of the lower cover
12: Depressing part
20: Upper cover
21: Bottom plate of the upper cover
22: Insertion slit
23: Insertion path
25: Card protection arm
30: Circuit board
31: Card connector
32: Connection terminal
40: Switching terminal
50: Cover

What is claimed:

1. An IC card reader comprising:

a lower cover (10) provided with a swingable depressing part (12), an upper cover (20) which is provided with an insertion slit (22) for an IC card, an insertion passage (23) communicated with said insertion slit (22), a window (24) opposing to an external terminal (1a) of the IC card (1) inserted into said insertion passage (23) and a swingable card protection arm (25), installed on said lower cover 10, and a circuit board (30) which is provided with a card connector (31) on its underside surface and installed on said upper cover (20) so that said card connector (31) is opposed to the external terminal (1a) of the IC card (1) inserted into said insertion passage (23) through said window (24).

2. An IC card reader according to claim 1, wherein a switching terminal (40) for connecting a contact provided on said circuit board (30) by a pushing up operation of said depressing part (12) is installed on the underside surface of said circuit board (30).

* * * * *